(12) United States Patent
Jang

(10) Patent No.: US 11,098,268 B2
(45) Date of Patent: Aug. 24, 2021

(54) DEVICE FOR MANUFACTURING SCENTED CANDLE

(71) Applicant: Jaeyun Jang, Incheon (KR)

(72) Inventor: Jaeyun Jang, Incheon (KR)

( * ) Notice: Subject to any disclaimer, the term of this patent is extended or adjusted under 35 U.S.C. 154(b) by 253 days.

(21) Appl. No.: 16/430,806

(22) Filed: Jun. 4, 2019

(65) Prior Publication Data

US 2019/0284504 A1 Sep. 19, 2019

Related U.S. Application Data

(63) Continuation-in-part of application No. PCT/KR2017/014354, filed on Dec. 8, 2017.

(30) Foreign Application Priority Data

Dec. 8, 2016 (KR) .................. 10-2016-0167047

(51) Int. Cl.
| | |
|---|---|
| *C11C 5/02* | (2006.01) |
| *G05B 23/02* | (2006.01) |
| *G10L 15/26* | (2006.01) |
| *C11C 5/00* | (2006.01) |

(52) U.S. Cl.
CPC .............. *C11C 5/023* (2013.01); *C11C 5/025* (2013.01); *G05B 23/02* (2013.01); *G10L 15/26* (2013.01); *C11C 5/002* (2013.01)

(58) Field of Classification Search
CPC ......... C11C 5/002; C11C 5/023; C11C 5/025; G05B 23/02; G06F 3/167; G10L 15/26
See application file for complete search history.

(56) References Cited

U.S. PATENT DOCUMENTS

| | | | | |
|---|---|---|---|---|
| 5,805,767 | A * | 9/1998 | Jouas ................. | G05D 23/1902 219/506 |
| 6,412,670 | B1 * | 7/2002 | Randmae ............... | C11C 5/023 222/452 |
| 6,805,312 | B2 * | 10/2004 | Capp ..................... | A47J 27/004 241/199.12 |
| 7,507,936 | B2 | 3/2009 | Mast et al. | |
| 7,846,372 | B1 * | 12/2010 | Njus ....................... | C11C 5/004 264/330 |
| 2009/0092938 | A1 * | 4/2009 | Husted ................... | C11C 5/025 431/292 |

(Continued)

FOREIGN PATENT DOCUMENTS

| | | |
|---|---|---|
| JP | 2001276095 | 10/2001 |
| KR | 1019950005967 | 3/1995 |

(Continued)

OTHER PUBLICATIONS

International Search Report—PCT/KR2017/014354 dated Feb. 22, 2018.

*Primary Examiner* — Michael M. Robinson
*Assistant Examiner* — Victoria Bartlett
(74) *Attorney, Agent, or Firm* — Cantor Colburn LLP

(57) ABSTRACT

Provided is a device for manufacturing a scented candle, the device including: a main body; a wax and oil supply portion provided at an upper portion of the main body and including a wax supplier melting and supplying wax and an oil supplier supplying fragrance oil; a base provided at a lower portion of the main body; and a container provided on the base and receiving the liquid wax and the fragrance oil.

8 Claims, 6 Drawing Sheets

(56) References Cited

U.S. PATENT DOCUMENTS

| | | | |
|---|---|---|---|
| 2012/0137634 A1* | 6/2012 | Cagle | C11C 5/021 53/431 |
| 2013/0325484 A1* | 12/2013 | Chakladar | G10L 15/22 704/275 |
| 2016/0317988 A1* | 11/2016 | Pryor, Jr. | B01F 11/0054 |
| 2017/0266876 A1* | 9/2017 | Hocker | B29C 64/106 |

FOREIGN PATENT DOCUMENTS

| KR | 101403951 | 6/2014 |
|---|---|---|
| KR | 2020150004078 | 11/2015 |
| KR | 1020160017990 | 2/2016 |

* cited by examiner

DEVICE FOR MANUFACTURING SCENTED CANDLE

BACKGROUND OF THE INVENTION

Field of the Invention

The present invention relates to a device for manufacturing a scented candle. More particularly, the present invention relates to a device for manufacturing a scented candle, the device enabling ordinary people to manufacture various scented candles easily.

Description of the Related Art

A candle is used to provide light and consists of a wick embedded in wax such as paraffin wax, soybean wax, and beeswax, which melts at a certain temperature and is molded in a combustible solid. In addition, a wax melt is a lump of solid wax with no wick.

A wax melt is made according to the same process as a candle: melting wax with hot water by using a double boiler method, pouring the melting wax into a container or a mold, and hardening the melting wax. However, a wax melt is used without burning a wick. The wax melt is put on the top of an aroma oil burner and heated by a tea light disposed at the bottom of the aroma oil burner, so that it is for enjoying fragrance produced as the wax melt melts. Fragrance oil (aroma compounds) is added in a paraffin wax, so that a conventional wax melt is mainly used for enjoying an imparted scent. In addition, a wick may be added to the wax melt, and a scented candle is popular in which the fragrance is produced while the wax melt is burned by lighting the wick.

Paraffin wax is a by-product of petroleum and a main material of the conventional wax melt and the scented candle. However, paraffin is known to release various toxic substances harmful to the human body, so that the use of paraffin is a contentious issue these days. In addition, odor, soot, and components of organic compounds are scattered to the air during combustion, leading to indoor air pollution and soil pollution when discarded.

Therefore, as environmental problems and well-being have become the concern of the public these days, paraffin wax used in conventional candles is replaced by soybean wax, which is a vegetable natural raw material, to solve environmental problems and health problems.

Using natural raw materials such as soybean wax and beeswax has merits in terms of health and environment, but maintaining the accurate temperature and the accurate ratio of oil for manufacture of scented candles is required, so that it is difficult for ordinary people to manufacture scented candles using natural raw materials.

SUMMARY OF THE INVENTION

Accordingly, the present invention has been made keeping in mind the above problems occurring in the related art, and an objective of the present invention is to provide a device for manufacturing a scented candle, the device setting an accurate temperature and an accurate ratio of mixing wax and oil, so that ordinary people can manufacture various scented candles.

In order to accomplish the above objective, there is provided a device for manufacturing a scented candle, the device including: a main body; a wax and oil supply portion provided at an upper portion of the main body and including a wax supplier melting and supplying wax and an oil supplier supplying fragrance oil; and a base provided at a lower portion of the main body. The device may further include: a container provided on the base and receiving the liquid wax and the fragrance oil.

The wax supplier may include: a first inner container where the wax is accommodated; a first heater provided outside the first inner container; and a first temperature sensor sensing a temperature of the first inner container. The oil supplier may include: a second inner container where the oil is accommodated; a second heater provided outside the second inner container; and a second temperature sensor sensing a temperature of the second inner container. The first inner container and the second inner container may be detachable from the wax supplier and the oil supplier, respectively.

The base may be provided with a third heater heating the container and a third temperature sensor sensing a temperature of the container.

The device may further include: a control switch provided to set a type of the wax to be melted; a memory storing melting temperatures and mixing temperatures in accordance with types of the wax; and a controller controlling the first heater to heat the first inner container using the melting temperature stored in the memory according to the wax type set by using the control switch and controlling the third heater to heat the container using the mixing temperature stored in the memory.

The wax may be supplied as a cartridge contained a predetermined amount of wax, and the oil may be supplied as a capsule contained a predetermined amount of oil. The controller may control the second heater so that the oil is supplied to the container from the second inner container when the container reaches the mixing temperature.

The device may further include: a communication device communicating with a user terminal, wherein a progress of manufacturing a scented candle is monitored through the user terminal. A user may manually set the melting temperature of the wax and the mixing temperature of the wax and the oil by means of the user terminal.

The controller may stop an operation of each of the first heater, the second heater, and the third heater when a proximity sensor provided on the base senses movement of the container or senses movement near the container.

A user may manually set the melting temperature of the wax and the mixing temperature of the wax and the oil by means of the control switch.

The memory may store a sentence or a word in a foreign language received from a user terminal, and the main body may be provided with a proximity sensor such that, when the proximity sensor senses movement within a predetermined distance, the controller repeatedly outputs the sentence or the word in the foreign language stored in the memory through a speaker provided in the main body.

The controller may analyze a sentence or a word spoken by a user and input through a microphone provided in the main body by means of a speech recognition algorithm, may compare whether the input sentence or word coincides with the sentence or word stored in the memory. Then, when the input sentence or word coincides with the sentence or word stored in the memory, the controller may transmit a signal to the user terminal so that an interpretation of the sentence or word is informed.

The main body may be provided with a fan supplying air to the container, wherein the controller controls the fan to operate until a cooling temperature stored in the memory coincides with the temperature of the container sensed by the third temperature sensor when the wax and the oil contained in the wax supplier and the oil supplier, respectively, are discharged.

The device may further include: a second holding clip holding one end of a wick; and a first holding clip into which the second holding clip is inserted and which is connected to a lower surface of the wax and oil supply portion. An opposite end of the wick may be provided with a fixing member fixed to a bottom surface of the container.

The wax and oil supply portion may be provided with a motor, wherein a stir rod is connected to a lower portion of the motor, the stir rod being accommodated in the container and rotating by the motor. The device may further include: a vibrator provided inside the base.

According to the device for manufacturing a scented candle of the present invention, it is possible to set an accurate temperature and an accurate ratio of mixing wax and oil, thereby enabling ordinary people to manufacture various scented candles.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, a device for manufacturing a scented candle according to embodiments of the present invention will be described in detail with reference to the accompanying drawings.

It should be understood that the following embodiments of the present invention are only for embodying the present invention and the scope of the present invention is not limited to the embodiments. Accordingly, those skilled in the art will appreciate that various modifications, additions and substitutions are possible, without departing from the scope and spirit of the invention as disclosed in the accompanying claims.

Figure 1:
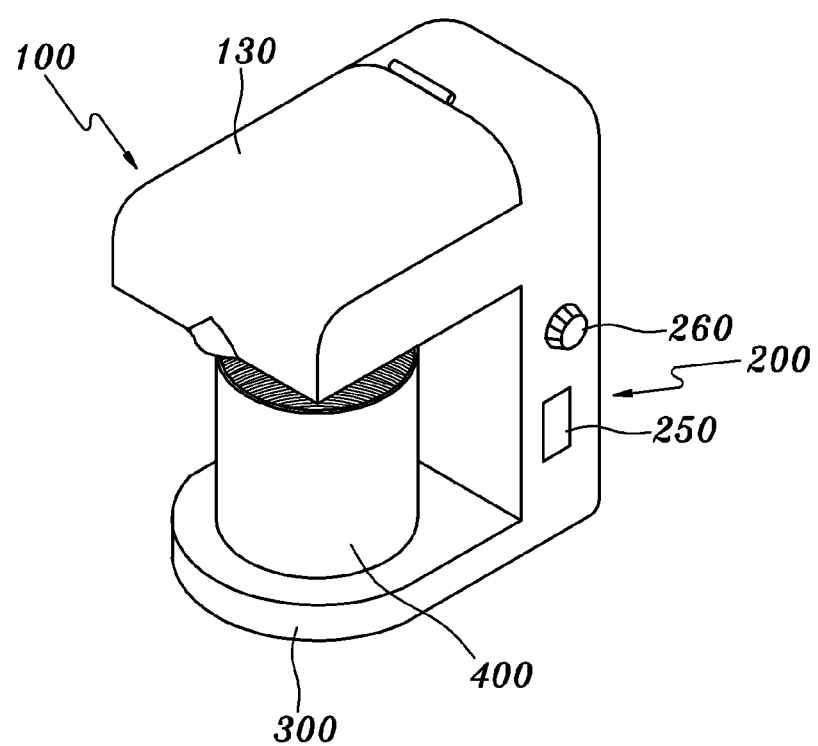
FIG. 1 is a perspective view illustrating a device for manufacturing a scented candle according to the present invention.
Figure 2:
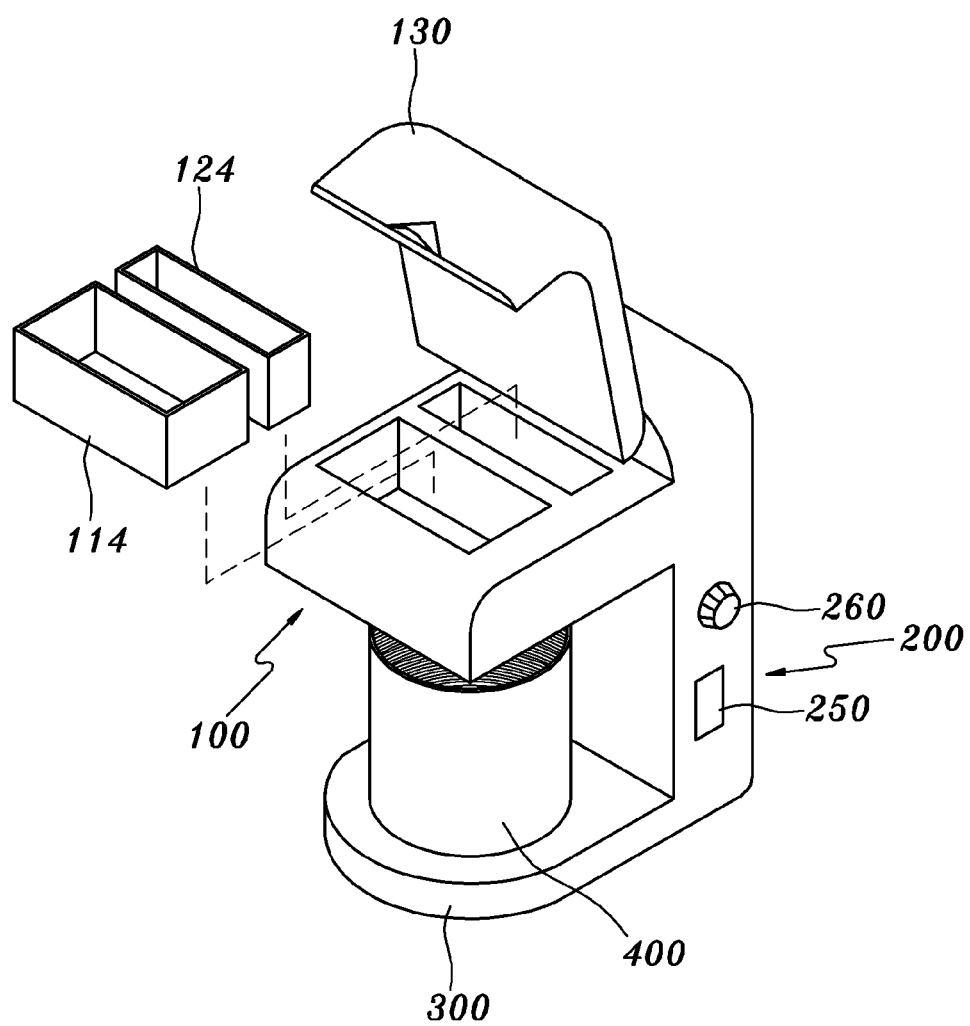
FIG. 2 is a perspective view illustrating a state where a cover of the device for manufacturing a scented candle according to the present invention is opened.
Figure 3:
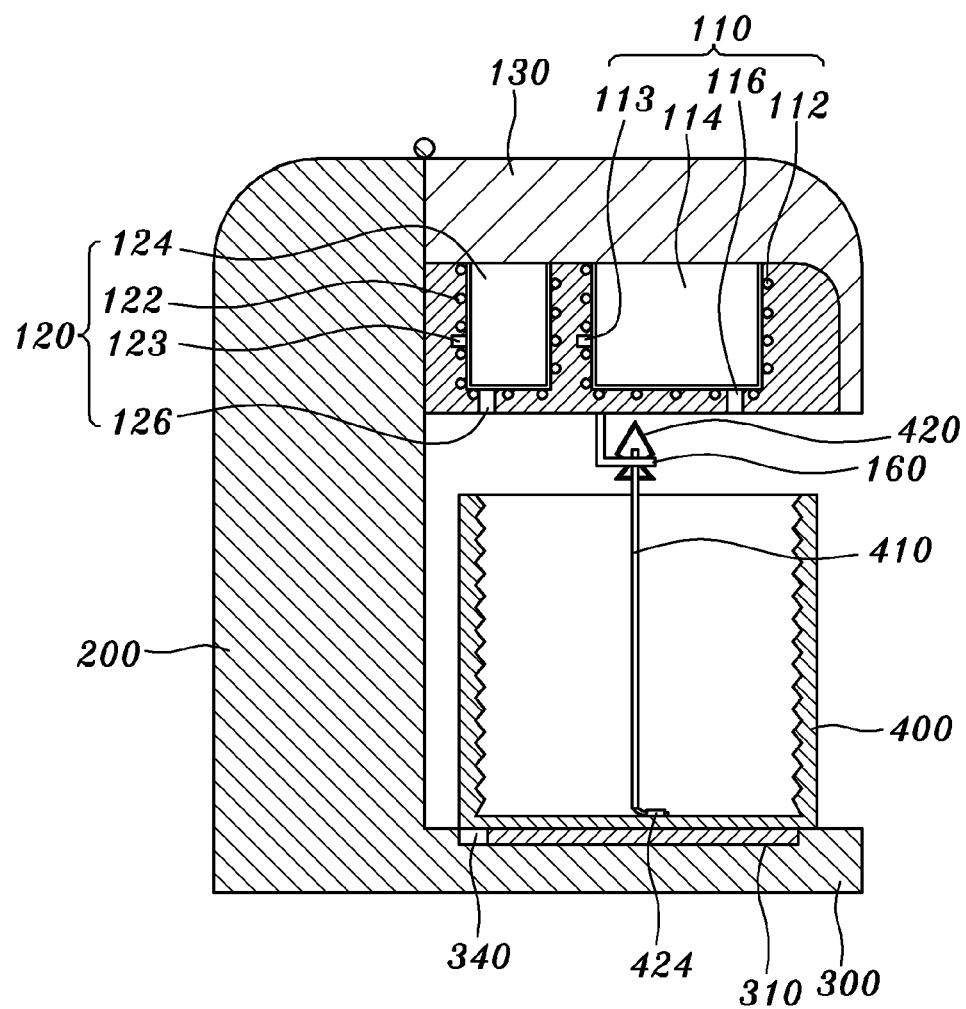
FIG. 3 is a cross-sectional view illustrating the device for manufacturing a scented candle according to the present invention.
Figure 4:
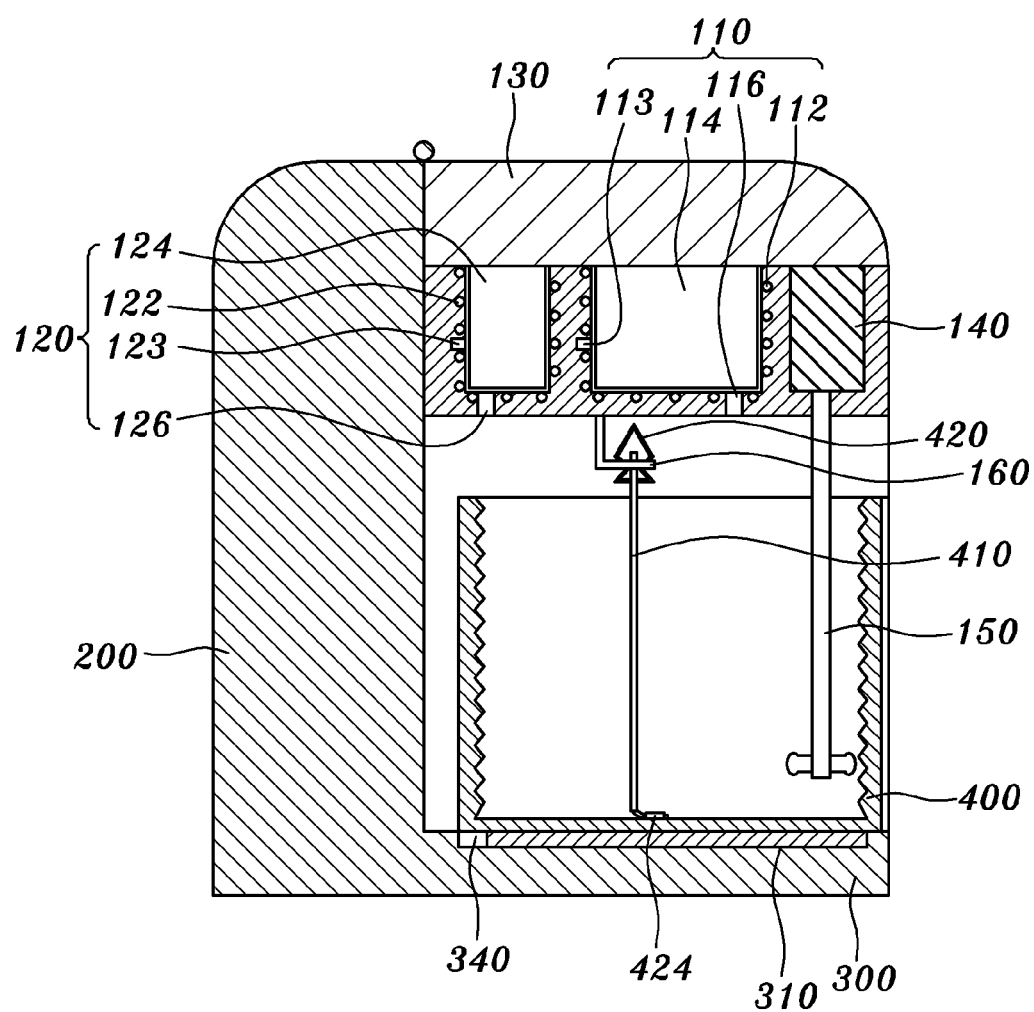
FIG. 4 is a cross-sectional view illustrating the device for manufacturing a scented candle according to the present invention having a stir rod.
Figure 5:
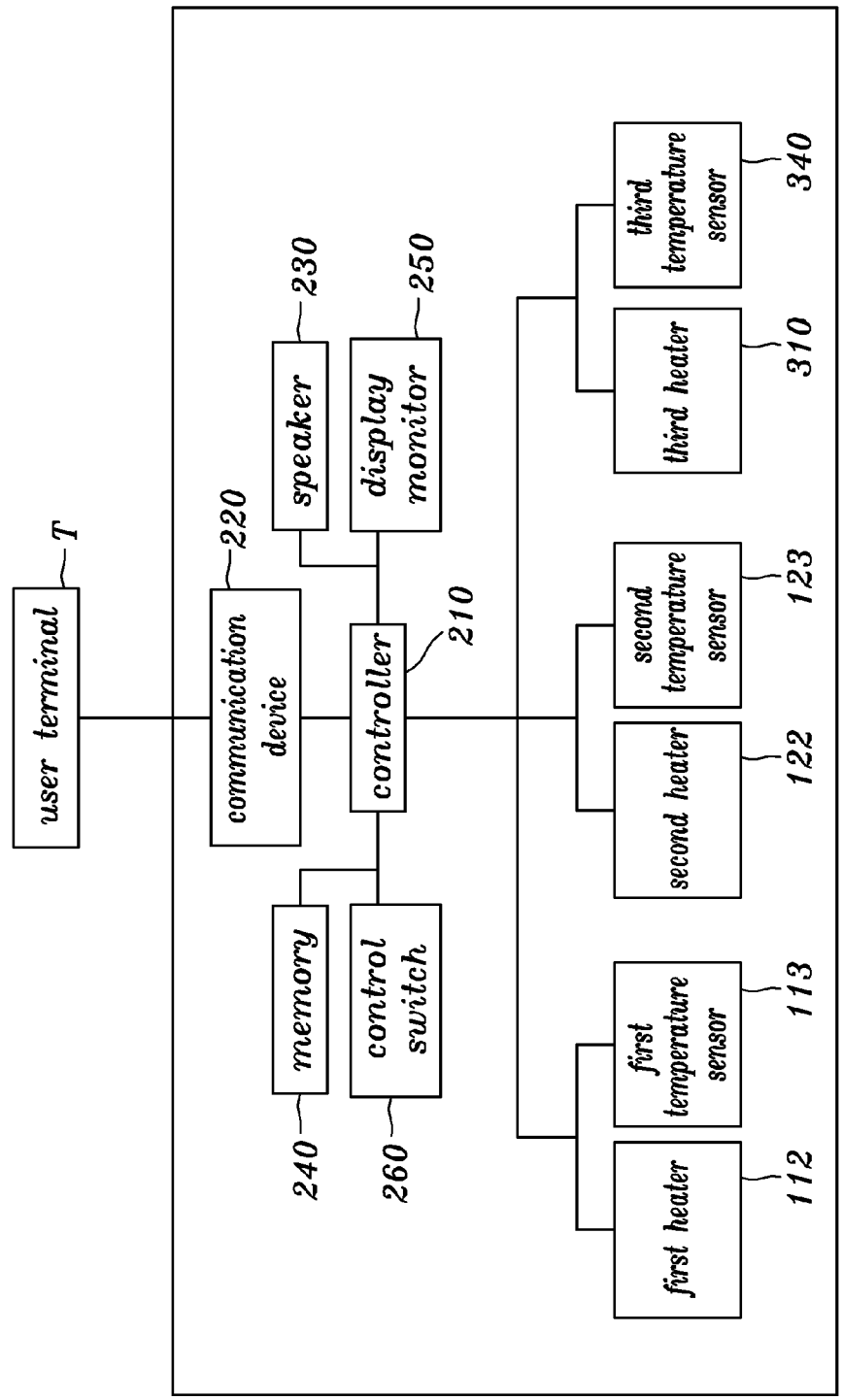
FIG. 5 is a configuration diagram illustrating the device for manufacturing a scented candle according to the present invention.
Figure 6:
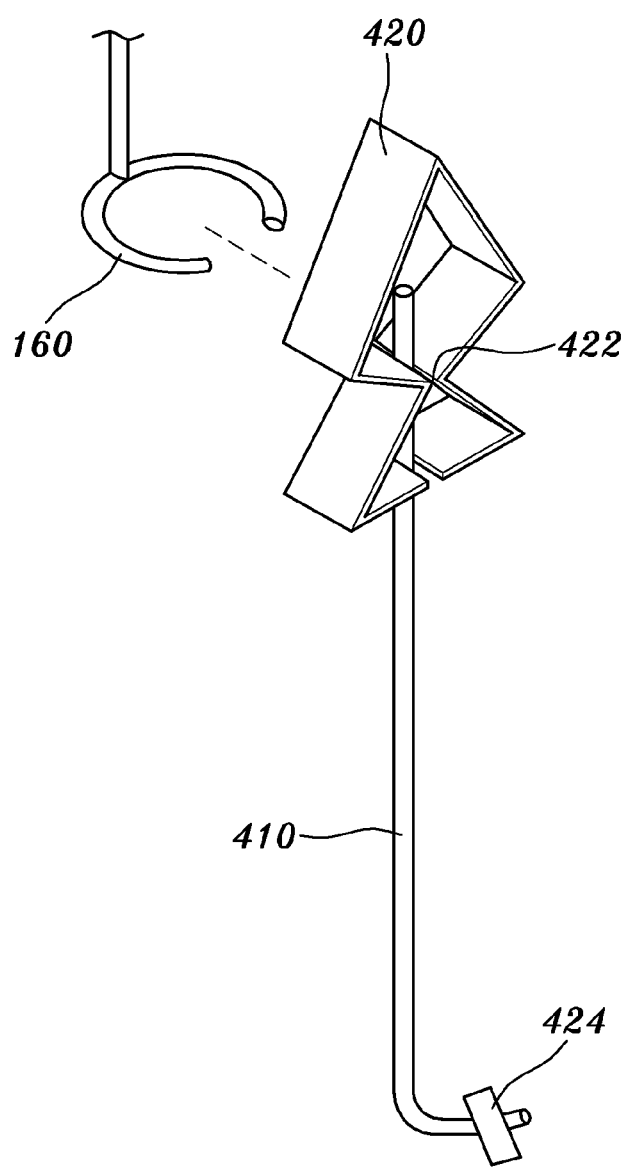
FIG. 6 is an exemplary view illustrating the device for manufacturing a scented candle according to the present invention sticking a wick.

FIG. 1 is a perspective view illustrating a device for manufacturing a scented candle according to the present invention; FIG. 2 is a perspective view illustrating a state where a cover of the device for manufacturing a scented candle according to the present invention is opened; and FIG. 3 is a cross-sectional view illustrating the device for manufacturing a scented candle according to the present invention. In addition, FIG. 4 is a cross-sectional view illustrating the device for manufacturing a scented candle according to the present invention having a stir rod; FIG. 5 is a configuration diagram illustrating the device for manufacturing a scented candle according to the present invention; and FIG. 6 is an exemplary view illustrating the device for manufacturing a scented candle according to the present invention sticking a wick. In FIGS. 1 to 6, some components are omitted.

The device for manufacturing a scented candle of the present invention will be described in detail with reference to FIGS. 1 to 6.

The device of the present invention is for manufacturing a scented candle by mixing various waxes and fragrance oils, the device including: a main body 200; a wax and oil supply portion 100 provided at an upper portion of the main body 200; a base 300 provided at a lower portion of the main body 200; and a container 400 provided on the base 300 and receiving waxes and fragrance oils.

Specifically, the wax and oil supply portion 100 includes: a wax supplier 110 provided at the upper portion of the main body 200, melting wax received therein, and supplying the wax to inside the container 400 provided on the base 300; and an oil supplier 120 provided at the upper portion of the main body 200 and supplying fragrance oil to inside the container 400.

In addition, the wax supplier 110 includes: a first inner container 114 where wax is accommodated; a first heater 112 provided outside the first inner container 114; and a first temperature sensor 113 provided outside the first inner container 114 when the first inner container 114 is mounted in the wax and oil supply portion 100. In addition, the oil supplier 120 includes: a second inner container 124 where oil is accommodated; a second heater 122 provided on the outside of the second inner container 124 when the second inner container 12 is mounted in the wax and oil supply portion 100; and a second temperature sensor 123 provided outside the second inner container 124.

Here, the first heater 112 and the second heater 122 may be embodied by a heating wire or a heating plate. Alternatively, the first heater 112 and the second heater 122 may be embodied by any one of various known technologies such as a surface heating element. In addition, the first heater 112 and the second heater 122 may be embodied by a heating device using an induction heating system, which is widely used. The first heater 112 and the second heater 122 respectively heat solid wax and oil provided in the first inner container 114 and the second inner container 124, respectively. The first temperature sensor 113 and the second temperature sensor 123 respectively sense the first inner container 114 and the second inner container 124 heated by the first heater 112 and the second heater 122, respectively, so that a controller 210 controls the temperature appropriately.

Here, the first inner container 114 and the second inner container 124 are detachable from the wax and oil supply portion 100. Thus, the first inner container 114 and the second inner container 124 are stored in the wax and oil supply portion 100 at the time of use, and after manufacturing a scented candle, the first inner container 114 and the second inner container 124 are separated to wash out oil or wax contained therein so that the remainder of the wax and the fragrant oil are not left. The first inner container 114 and the second inner container 124 may be provided individually or integrally with each other.

The base 300 provided at the lower portion of the main body 200 is provided with a third heater 310 and a third temperature sensor 340, wherein the third heater 310 heats the container 400, and third temperature sensor 340 senses the temperature of the container 400. Thus, wax and oil supplied to inside the container 400 are kept at a constant temperature and mixed in a stable state. The third heater 310 may also be embodied by a heating wire or a hot plate. Alternatively, the third heater 310 may be embodied by any one of various known technologies such as a surface heating element. In addition, the third heater 310 may be embodied by a heating device using an induction heating system, which is widely used.

A type of wax to be melted may be set by using a control switch 260 provided in the main body 200. According to the set wax type, the controller 210 controls the first heater 112 to heat the first inner container 114 using a melting point of the temperature (hereinafter, referred to as melting temperature) of the wax stored in a memory 240, and then the controller 210 controls the third heater 310 to heat the container 400 using a temperature (hereinafter, referred to as mixing temperature) stored in the memory 240 at which the wax and oil are mixed together. The controller 210 may include a processor such as an MCU and DSP and be implemented in a form of a computer program that is operated by the processor. That is, it is preferable that the memory 240 stores melting temperatures of various waxes and mixing temperatures in a table format.

Therefore, since the device for manufacturing a scented candle of the present invention mixes wax and oil at an accurate ratio and an accurate temperature, ordinary people can manufacture a high-quality scented candle.

The control switch 260 may be provided in the main body 200 or in the wax and oil supply portion 100, although not illustrated in the drawings.

Wax is supplied as a cartridge contained a predetermined amount of solid wax, and oil is supplied as a capsule contained a predetermined amount of oil. Therefore, a user can adjust the ratio of wax and oil accurately without weighing the wax and the oil separately to adjust the ratio thereof.

For example, the wax is supplied as large, medium, and small cartridges, and the oil is supplied as a capsule contained a predetermined same amount of oil. In the case of using a small cartridge wax, three capsules of oil are used to mix with the wax. In the case of using a medium cartridge, five capsules of oil are used to mix with the wax, and in the case of using a large cartridge, seven capsules of oil are used to mix with the wax. In addition, various fragrance oils are used. Since each fragrance oil is supplied in a capsule, the user can mix various fragrance oils at an appropriate ratio to produce various fragrances. It is also possible to supply fragrant oil and wax in a single cartridge.

The capsule containing fragrance oil is configured to melt at a predetermined temperature such that the oil contained therein is discharged at the predetermined temperature. Accordingly, the controller 210 controls the temperature of the second heater 122 provided in the oil supplier 120 to supply the oil at the accurate mixing temperature. In other words, when the container 400 reaches the mixing temperature, the controller 210 controls the second heater 122 such that the oil is supplied to the container 400 from the second inner container 124.

The device for manufacturing a scented candle of the present invention further includes: a second holding clip 420 holding one end of a wick 410; and a first holding clip 160 into which the second holding clip 420 is inserted securely and which is connected to a lower surface of the wax and oil supply portion. Specifically, the first holding clip 160 preferably has a C-ring shape as illustrated in FIG. 6. The second holding clip 420 is made of a metal or synthetic resin having excellent elasticity and formed in a shape of a Christmas tree. In addition, the second holding clip 420 is configured to have a holding part 422 having a narrow waist to hold the wick 410 securely. The holding part 422 is inserted into the first holding clip 160 such that the first holding clip 160 is held by the wide width of an upper portion of the second holding clip 420.

Here, a fixing member 424 using a sticker or an adhesive is provided at the opposite end of the wick 410 to firmly fix the wick 410 to an inner bottom surface of the container 400.

The holding part 422 of the second holding clip 420 presses both sides of the wick 410 to hold the wick 410. Thus, the user can adjust the holding position of the wick by pulling the wick 410 over a predetermined force.

The user fixes the wick 410 to the bottom surface of the container 400 using the fixing member 424 provided at the opposite end of the wick 410. Then, the user allows the first holding clip 160 to hold the second holding clip 420 and adjusts the length of the wick 410 by pulling one end of the wick 410 held by the second holding clip 420, so that the wick 410 is kept tense. Thus, the wick 410 can maintain the shape thereof while wax and oil are supplied.

Here, serrated protrusions (not illustrated) may be further formed on the holding part 422 of the second holding clip 420. Accordingly, it is possible to adjust the length of the wick 410 easily by pulling only in one direction by the serrated protrusions.

A method of manufacturing a scented candle by using the device for manufacturing a scented candle of the present invention will be described. A cover 130 provided on the wax and oil supply portion 100 is opened to accommodate a wax cartridge selected by the user in the first inner container 114 and to accommodate an oil capsule selected by the user in the second inner container 124, and then the cover 130 is closed.

Then, when the user sets the type of wax by adjusting the control switch 260, the controller 210 receives information on an optimum melting temperature and mixing temperature of the selected wax, which is stored in the memory 240, and controls the first heater 112, the second heater 122, and the third heater 130.

Accordingly, the first heater 112 is maintained at an appropriate temperature under the control of the controller 210 so that the wax is stably melted. The melted wax is discharged through a first outlet 116 provided at a lower portion of the wax supplier 110 and is accommodated inside the container 400.

Here, the first outlet 116 may be provided with an automatic valve to appropriately adjust the discharge amount of wax.

The controller 210 senses the temperature of the container 400. When the temperature of the container 400 reaches the appropriate temperature for mixing the wax and the fragrance oil, the controller 210 controls the second heater 122 provided in the second inner container 124 to heat and melt the oil capsule, so that the oil inside the capsule is supplied to the container 400 through a second outlet 126 of the oil supplier 120.

Here, the second outlet 126 may be provided with an automatic valve to appropriately adjust the discharge amount of oil. In addition, screw-shaped protrusions are formed on an inner circumferential surface of the container 400. Accordingly, while the melted wax and the fragrance oil are supplied to the container 400, the wax and the fragrance oil are rotated along the protrusions of the inner circumferential surface, so that the wax and the fragrance oil are mixed together in a more stable state.

As illustrated in FIG. 4, a stir rod 150 rotated by a motor 140 is provided on one side of the wax and oil supply portion 100. The stir rod 150 is rotated under the control of the controller 210 to mix the oil and the wax thoroughly.

It is preferable that the stir rod 150 is made of silicone to prevent damage to the wax or oil and to prevent the release of endocrine disruptors, thereby preventing harmful effects on the user health.

Although not illustrated in the drawings, a vibrator may be provided inside the base 300 to facilitate mixing of the wax and oil contained in the container 400 by vibrating the container 400.

Finally, after the oil and the wax are completely supplied to the container 400, the operation of the third heater 310 of the base 300 is stopped to harden a scented candle.

Although not illustrated in the drawings, a proximity sensor may be provided at the base 300. When the proximity sensor senses the movement of the container 400 or senses the movement near the container 400, the operations of the first heater 112, the second heater 122, and the third heater 130 are stopped.

For example, when an infant or young child tries to hold the container 400 or the base 300 by hand, the controller 210 controls the first heater 112, the second heater 122, and the third heater 130 to turn off, so that it is possible to prevent the infant or young child from being burned due to the heat generated from the first heater 112, the second heater 122, and the third heater 130.

Although not illustrated in the drawings, a weight sensor may be provided in the wax and oil supply portion 100 to sense the weight of the first inner container 114 and the second inner container 124. In detail, the weight sensor senses the amount of wax and oil contained in the first inner container 114 and the second inner container 124, respectively, so that it is possible to accurately sense the production status of the scented candle.

A display monitor 250 may be provided in the main body 200 or in the wax and oil supply portion 100. The user can know the current temperature and the production state of the scented candle by means of the display monitor 250, so that the time until completion of the manufacture can be checked. After the manufacture is completed, the controller 210 stops the operations of the first heater 112, the second heater 122, and the third heater 130 to prevent a fire or burn. Here, the display monitor 250 may be provided on the main body 200 or may be provided on the wax and oil supply portion 100.

It is preferable that a communication device 220 is provided in the main body 200. The communication device 220 is provided with a local wireless communication function such as Bluetooth, and is capable of communicating with a user terminal T such as a smartphone or a tablet computer.

Accordingly, the production state or the current temperature sensed by the controller 210 is transmitted to an external terminal so that the user can know the production state even when being a predetermined distance away and can control each part of the device for manufacturing a scented candle by means of the user terminal T.

That is, the user terminal T stops the operations of the first heater 112, the second heater 122, and the third heater 130 in an emergency situation, thereby preventing a fire or other danger. The user terminal T not only automatically sets the melting temperature and the mixing temperature of the wax whose type is set among the stored wax types by the control switch 260, but also inputs information on additional types of waxes, and a melting temperature and a mixing temperature thereof through a user mode. In addition, the user terminal T instructs the pausing or stopping of the operation of the device for manufacturing a scented candle of the present invention through the control switch 260. The user terminal T sets the melting temperature and the mixing temperature manually by rotating the control switch 260 of the main body 200, as well as setting the wax type using the control switch 260 of the main body 200.

A speaker 230 may be provided on the main body 200 such that the production state of the scented candle or the completion of the production is notified and warning of a fire or the like is promptly provided in an emergency situation.

Although not illustrated in the drawings, an overheat sensor may be provided in the main body 200 to sense the temperature of the first inner container 114, the second inner container 124, and the container 400. When the overheat sensor senses overtemperature, the operations of the first heater 112, the second heater 122, and the third heater 310 are stopped to prevent a fire.

Although not illustrated in the drawings, a battery may be provided in the main body 200 or the base 300. The device is charged with the power source when the external power exists and uses the power of the battery in the outdoors or in case of a power failure.

Although not illustrated in the drawings, a height adjustable structure may be applied to the main body 200 or the base 300 such that the user adjusts the height appropriately for ease of use.

According to the device for manufacturing a scented candle of the present invention, in addition to manufacturing a scented candle, it is possible to manufacture soap having various fragrances and colors by using wax and oil.

The memory 240 provided in the main body 200 stores a sentence or a word in a foreign language received from the user terminal T communicated through the communication device 220.

Here, the main body 200 is provided with the proximity sensor (not illustrated) sensing an adjacent object using a laser, an ultrasonic wave, or the like. When the movement of a person or the like is sensed within a distance set by the controller 210, the sentence or the word in the foreign language stored in the memory 240 is repeatedly output through the speaker 230 provided in the main body 200.

Accordingly, the user can continuously learn the foreign language in an easy way by listening to the same sentence or word output from the speaker 230 repeatedly.

In addition, although not illustrated in the drawings, a microphone and a button may be provided in the main body 200. When pressing the button, the microphone is operated to receive a sentence or a word in a foreign language which the user speaks and the sentence or the word is stored in the memory 240.

Here, the controller 210 analyzes the contents spoken by the user and stored in the memory 240 and determines whether the analyzed contents and the contents output through the speaker 230 coincide with each other. When it is determined that the analyzed contents and the contents output through the speaker 230 coincide with each other, the user can see the interpretation of the sentence or the word in the foreign language by means of the user terminal T, and the controller 210 sends a signal to the user terminal T to allow the learning of the next step to proceed. Accordingly, the user can more easily study the foreign language.

Although not illustrated in the drawings, a fan may be provided to supply air to the container 400. The memory 240 stores an optimal cooling temperature for hardening the wax mixed with oil. When the oil and wax contained in the wax supplier 110 and the oil supplier 120 are discharged, the controller 210 controls the fan to drive until the cooling temperature stored in the memory 240 and the temperature of the container 400 sensed by the third temperature sensor 340 coincide with each other.

In other words, the temperature sensed by the third temperature sensor 340 is compared with the cooling temperature. When the temperature of the container 400 is higher than the cooling temperature, the controller 210 controls the fan to operate to lower the temperature to the cooling temperature quickly.

When the temperature of the container 400 is the same as the cooling temperature, the controller 210 controls the fan to stop to keep the optimal temperature for hardening the wax, thereby preventing cracking in the scented candle.

According to the present invention, the device for manufacturing a scented candle includes: the wax supplier 110 containing and melting the solid wax; the oil supplier 120 supplying the oil containing the predetermined fragrance; the container 400; and the controller 210. When the user sets the type of wax to be used, it is possible to melt the wax at the optimum temperature automatically and sense the temperature of the melted wax to automatically mix the wax with the oil at the optimum temperature. Therefore, ordinary people can manufacture a high-quality scented candle with wax and oil.

According to the present invention, the wax and the fragrance oil are supplied in a form of a cartridge and a capsule having a predetermined amount, respectively, so that the wax and the oil can be supplied at an accurate ratio without need of weighing the wax and the oil. In addition, it is possible to manufacture a user's own unique fragrance by mixing different kinds of oils properly according to own taste.

According to the present invention, a communication device that enables short-range wireless communication such as Bluetooth is provided. Therefore, the communication device transmits the production state of the scented candle to the user terminal T to allow the user to monitor the production state. In addition, when using a new type wax, it is possible to control the temperature manually by means of the user terminal T, so that various types of waxes can be used to manufacture a scented candle.

What is claimed:

1. A device for manufacturing a scented candle, the device comprising, a main body; a wax and oil supply portion provided at an upper portion of the main body including a wax supplier configured to melt and supply wax and an oil supplier configured to supply oil; a base provided at a lower portion of the main body; a container provided on the base and configured to receive the wax and the oil; a second holding clip holding one end of a wick and a first holding clip into which the second holding clip is inserted and which is connected to a lower surface of the wax and oil supply portion.

2. The device of claim 1, wherein the wax supplier includes:
 a first inner container where the wax is accommodated;
 a first heater provided outside the first inner container; and
 a first temperature sensor sensing a temperature of the first inner container.

3. The device of claim 2, wherein the oil supplier includes:
 a second inner container where the oil is accommodated;
 a second heater provided outside the second inner container; and
 a second temperature sensor sensing a temperature of the second inner container.

4. The device of claim 3, wherein the first inner container and the second inner container are detachable from the wax supplier and the oil supplier, respectively.

5. The device of claim 3, wherein the base is provided with a third heater heating the container and a third temperature sensor sensing a temperature of the container.

6. The device of claim 1, wherein an opposite end of the wick is provided with a fixing member fixed to a bottom surface of the container.

7. The device of claim 1, wherein the wax and oil supply portion is provided with a motor,
 wherein a stir rod is connected to a lower portion of the motor, the stir rod being accommodated in the container and rotating by the motor.

8. The device of claim 1, further comprising:
 a vibrator provided inside the base.

* * * * *